(12) United States Patent
Kudrashova (10) Patent No.: US 8,678,470 B2
(45) Date of Patent: Mar. 25, 2014

(54) CONVERTIBLE TOP HAVING AN EMBROIDERED DESIGN

(76) Inventor: Natalie Kudrashova, Massapequa Park, NY (US)

( * ) Notice: Subject to any disclaimer, the term of this patent is extended or adjusted under 35 U.S.C. 154(b) by 0 days.

(21) Appl. No.: 13/091,109

(22) Filed: Apr. 20, 2011

(65) Prior Publication Data
US 2011/0260494 A1    Oct. 27, 2011

Related U.S. Application Data

(60) Provisional application No. 61/328,211, filed on Apr. 27, 2010.

(51) Int. Cl.
*B60J 7/00*    (2006.01)

(52) U.S. Cl.
USPC ................................. 296/107.09; 112/475.18

(58) Field of Classification Search
USPC ............... 296/107.09, 107.15, 1.08, 136.09; 112/475.08, 439; 428/31
IPC .......................................................... B60N 2/44
See application file for complete search history.

(56) References Cited

U.S. PATENT DOCUMENTS

| | | | |
|---|---|---|---|
| 1,645,699 A | | 10/1927 | Gullborg |
| 2,026,585 A | | 1/1936 | Marshall |
| 2,765,192 A | | 10/1956 | Blake |
| 3,926,471 A | | 12/1975 | Nadasi |
| 3,935,353 A | | 1/1976 | Doerfling |
| 4,711,190 A | * | 12/1987 | Smith ...................... 112/475.23 |
| 4,714,290 A | | 12/1987 | Eash |
| 5,058,299 A | | 10/1991 | Suzuki |
| 5,343,401 A | | 8/1994 | Goldberg |
| 5,415,451 A | | 5/1995 | Stanton |
| 5,507,109 A | | 4/1996 | Rinzler |
| 5,549,940 A | | 8/1996 | Noone |
| 5,671,491 A | | 9/1997 | Ladd |
| 6,120,087 A | | 9/2000 | Lake |
| 6,273,493 B1 | | 8/2001 | Woo |
| 6,398,287 B1 | | 6/2002 | Smith et al. |

(Continued)

OTHER PUBLICATIONS

Teresa Burney, Couples have designs for Success, St petersburg Times, Sunday Apr. 1991.*

*Primary Examiner* — Glenn Dayoan
*Assistant Examiner* — Pinel Romain (57) ABSTRACT

A convertible top for a vehicle includes a flexible material and an embroidered pattern. The embroidered pattern is formed by at least one yarn in the flexible material. The embroidered pattern contrasts from the flexible material to provide an aesthetic feature to the flexible material. In a second embodiment, a method of decorating a convertible top includes providing a convertible top connected to a vehicle. The convertible top has latches, a window, a frame and a layer of fabric. The method includes removing the convertible top from the vehicle and removing the latches, the window, and the frame from the layer of fabric. The method further includes introducing the layer of fabric to a sewing and embroidery machine and selecting a pattern. The method further includes providing a yarn operatively coupled to the sewing and embroidery machine and stitching the yarn into the layer of fabric, wherein the yarn forms an embroidered pattern that approximates the pattern. The method further includes cutting the yarn and removing the layer of fabric with the embroidered pattern from the sewing and embroidery machine and connecting the latches, the window, and the frame to the layer of fabric to form the convertible top. Thereafter, the convertible top is connected to the vehicle.

23 Claims, 7 Drawing Sheets

(56) References Cited

U.S. PATENT DOCUMENTS

| | | |
|---|---|---|
| 6,620,365 B1 * | 9/2003 | Odoi et al. ............... 264/261 |
| 6,857,652 B2 * | 2/2005 | Dougherty ............... 280/507 |
| 7,108,411 B2 | 9/2006 | Pommeret |
| 7,264,299 B2 | 9/2007 | Wall |
| 7,311,112 B2 * | 12/2007 | Pacheco ............... 135/88.07 |
| 7,559,596 B2 * | 7/2009 | Garska et al. ........... 296/107.09 |
| 7,644,969 B2 * | 1/2010 | Foster et al. ............. 296/1.08 |
| 2002/0007888 A1 | 1/2002 | Gregorek |
| 2002/0179653 A1 * | 12/2002 | Klamm ................ 224/153 |
| 2003/0023574 A1 | 1/2003 | Bailie |
| 2005/0224543 A1 | 10/2005 | Cope |
| 2006/0138187 A1 | 6/2006 | Love |
| 2009/0289468 A1 | 11/2009 | Peco |

* cited by examiner

CONVERTIBLE TOP HAVING AN EMBROIDERED DESIGN

CROSS REFERENCE TO RELATED PATENT APPLICATIONS

This patent application claims priority to U.S. Provisional Patent Application Ser. No. 61/328,211 filed on Apr. 27, 2010, which is herein incorporated by reference in its entirety.

FIELD OF THE INVENTION

The present disclosure is directed to a convertible top for a vehicle. More particularly, the present disclosure is directed to a convertible top that includes an aesthetically pleasing embroidered pattern in the convertible top. The embroidered pattern may provide an additional vehicle safety feature.

BACKGROUND OF THE RELATED ART

Figure 1:
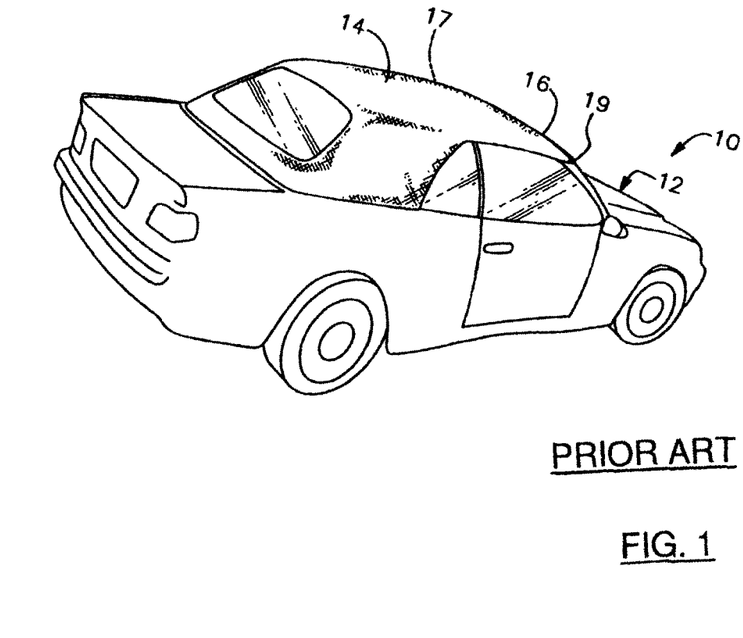
FIG. 1 shows a prior art configuration of an automobile having a decorative cover member clipped to the existing convertible top.

Prior art convertible tops are known in the art. U.S. Pat. No. 6,120,087 to Blake (hereinafter "Blake"), which is herein incorporated by reference in its entirety discloses a decorative cover for a convertible top shown in FIG. 1. The decorative cover includes a member 14 that is clipped onto an existing convertible top 12 to enhance the aesthetic appeal of a convertible top and automobile. Opposite ends 17 and 19 are curved to fit on the existing convertible top 12. The leading edge of the decorative cover member is secured to a molded boot that frictionally engages the leading end of the existing convertible top 12. The decorative cover includes a clip 16. The molded boot is one continuous part to prevent air from getting into a space between the existing convertible top and the decorative cover member. A plurality of side clips are used to clip the sides of the decorative cover member to the sides of the existing convertible top. The decorative cover member is sewn or adhered to a preselected surface of each of the side clips. The trailing edge of the decorative cover member is clipped to the storage well or other available part of the automobile.

Blake is deficient in that the decorative cover may become pulled off of existing convertible top when driving if secured incorrectly by the user and air can enter between the member and the existing convertible top. Moreover, Blake's design includes a decorative cover that includes a space between the decorative cover and the existing convertible top. Water, dirt, leaves or the like can be held between the decorative cover and the existing convertible top and can be difficult to remove. Additionally, mold can grow between the space between the decorative cover and the existing convertible top, which is disfavored, if the user does not frequently clean between the space and the existing convertible top. Further to quickly draw the top down the decorative cover member needs to be removed otherwise the bulky configuration and clips may break the rear window when folded.

The prior art does not allow a user to include an integral convertible top with an aesthetically pleasing pattern or design integrally formed with the convertible top. The prior art also does not allow a user to include an integral design that will not be removed and that will remain clean and will be cleaned when the user cleans the automobile in a car wash. Moreover, the prior art does not provide the user with a decorative cover that also can manufactured with a specific reflective material to provide an additional reflective surface of a vehicle. The prior art also does not provide the user with a convertible top having a decorative feature that can remain on the existing convertible top when the convertible top is retracted, folded and opened. It is an object of the invention to provide for an embroidered car top that will encourage a female demographic to take an interest in convertible cars.

SUMMARY OF THE INVENTION

According to a first aspect of the present disclosure, there is provided a convertible top for a vehicle includes a flexible material and an embroidered pattern. The embroidered pattern formed by at least one yarn in the flexible material. The embroidered pattern contrasts from the flexible material to provide an aesthetic feature to the flexible material.

In yet another aspect of the present disclosure there is provided vehicle safety device. The vehicle safety device comprises a flexible convertible top disposed on a first vehicle. The vehicle safety device further comprises an embroidered pattern formed by at least one reflective yarn in the flexible convertible top. The reflective yarn reflects a second vehicle's headlights and provides an indication of the first vehicle to a driver of the second vehicle.

In another embodiment of the present disclosure, there is provided a method of decorating a vehicle. The method includes providing a flexible material on the vehicle. The method also includes stitching at least one fiber in an embroidered pattern that visually contrasts from the flexible material to provide an aesthetic feature to the vehicle.

According to yet another embodiment of the present disclosure there is provided a method of decorating a vehicle. The method comprises embroidering an aesthetically pleasing decoration comprising at least one reflective yarn on a convertible top of a vehicle.

According to a further embodiment of the present disclosure, there is provided a method of decorating a convertible top. The method includes providing a convertible top connected to a vehicle. The convertible top has latches, a window, a frame, and a layer of fabric. The method includes removing the convertible top from the vehicle and removing the latches, the window, and the frame from the layer of fabric. The method further includes introducing the layer of fabric to a sewing and embroidery machine and selecting a pattern. The method further includes providing a yarn operatively coupled to the sewing and embroidery machine and stitching the yarn into the layer of fabric, wherein the yarn forms an embroidered pattern that approximates the pattern. The method further includes cutting the yarn and removing the layer of fabric with the embroidered pattern from the sewing and embroidery machine and connecting the latches, the window, and the frame to the layer of fabric to form the convertible top. Thereafter, the convertible top is connected to the vehicle.

According to yet a further embodiment of the present disclosure there is provided a method of decorating a vehicle. The method comprises embroidering an aesthetically pleasing decoration on or in a form of a patch. The aesthetically pleasing decoration comprises at least one yarn. The patch is removably connected to a convertible top of a vehicle.

According to yet a further embodiment of the present disclosure there is provided a method of advertising. The advertising may be short term advertisements that can be disposed on the convertible top, for example, it is a boy. The ads can be removable and replaceable with a new short message that is desired by the user. The method comprises embroidering an aesthetically pleasing advertisement comprising at least one yarn on a convertible top of a vehicle. The method then comprises displaying the advertisement to at least one viewer to promote the advertisement. In yet another embodiment, the advertisement can be removable with an adhesive instead of being embroidered.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, the drawings are illustrative of certain ways of performing the invention. Others will be readily apparent to those skilled in the art.

DETAILED DESCRIPTION OF THE PREFERRED EMBODIMENTS

Figure 2:
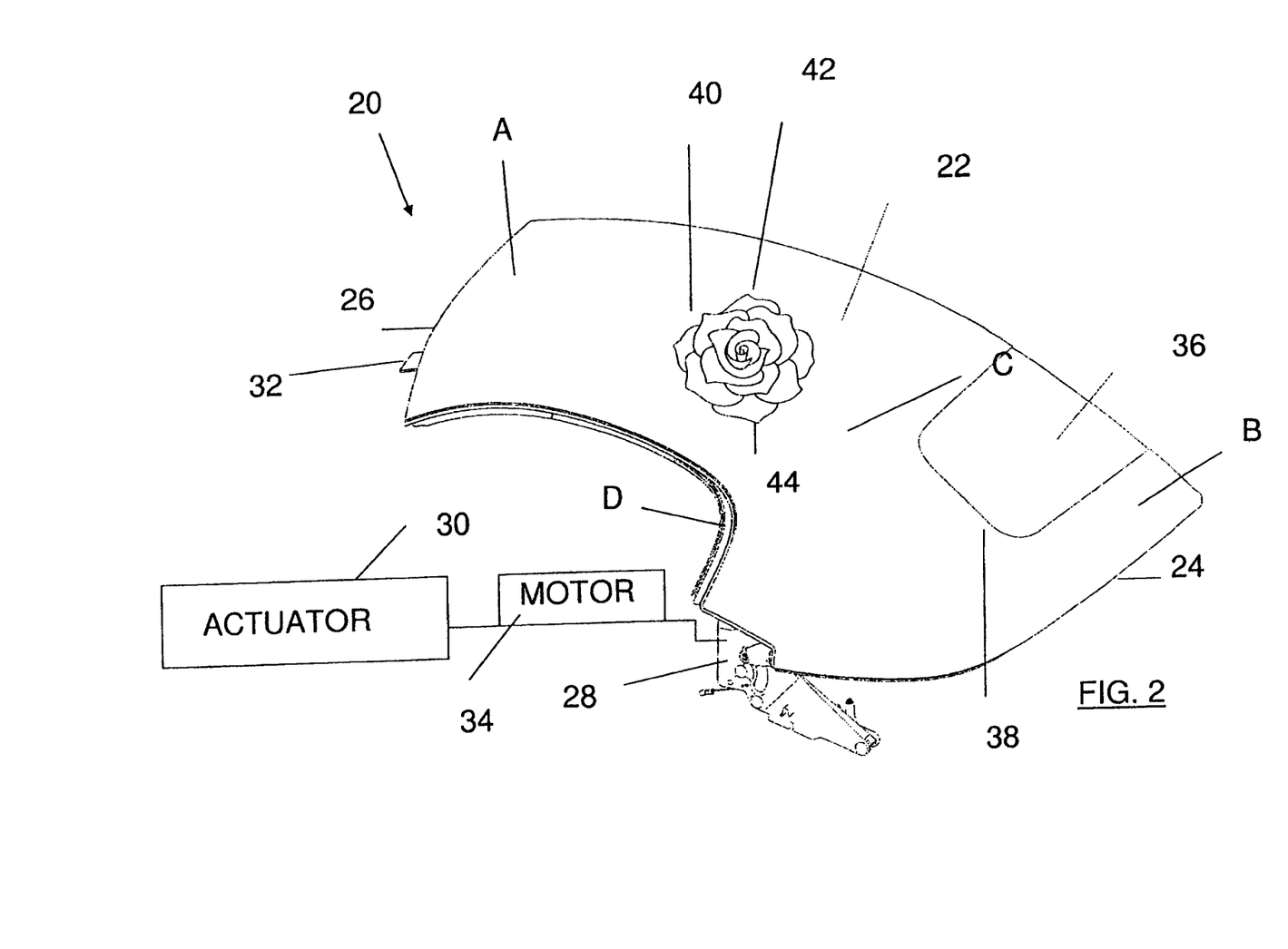
FIG. 2 shows a perspective view of the decorative convertible top having an embroidered design according to the present disclosure.

The present disclosure preferably is directed to a vehicle 20 that includes a vinyl, fabric, or textile like cover 22 that may be retracted. A so called "convertible car" is a type of automobile in which the roof 22 is made from a fabric material that is disposed taught to cover the driver and occupants but also that can retract and fold away, converting the vehicle 20 from an enclosed or covered vehicle 20 to an open-air vehicle 20. Several different automobile body styles, models and makes are manufactured and marketed in convertible form as is known in the art. For example, the 2010 AUDI® A4® 2.0 T QUATTRO® CABRIOLET® CONVERTIBLE manufactured by Audi of Germany is one example of a convertible car. Roof 22 designs can be different from model to model, but the models generally share features that are common to all convertibles. The vinyl or canvas fabric roof member 22 is generally connected at one end 24 to the body of the vehicle 20 and is usually not detachable or removable from the vehicle 20. Instead the vinyl or canvas fabric roof member 22 is connected at a first end 24 and a second end 26, which is opposite the first end 24 folds away, either into a recess behind a rear seat or into a boot or a trunk of the vehicle 20.

The vinyl or canvas fabric roof member 22 may operate either manually or automatically via hydraulic or electrical actuators 28. Generally, the user will actuate a button 30, and disengage a first or second locking member 32 and lower the windows. The motor 34 will actuate and pull the cantilevered vinyl or canvas fabric roof member 22 to fold and be retained within the boot or rear seats in a folded configuration. The vinyl or canvas fabric roof member 22 may be constructed of soft or rigid material. The soft configuration of the vinyl or canvas fabric roof member 22 is generally referred to as "a soft-top convertible". The fabric roof member 22 can be made from any textile material.

The collapsible textile roof member 22 (of cloth or vinyl) preferably folds over an articulated folding frame (not shown) that is on an opposite side of the roof member 22 facing the occupants. The frame generally can be made from a resilient material, such as aluminum or the like. The collapsible textile roof member 22 also may include an interior lining that can hide the frame, provide insulation such as a sound-deadening layer. The vehicle 20 may also have an electrical or electro-hydraulic mechanism 28 for raising the roof member 22 about the second end 26, which is connected to an actuator 30 and a power supply. The erected top of the fabric layer 22 preferably includes at least one connector 32 that can connect to a windshield frame header (not shown). Connector 32 may comprise manual latches, semi-manual latches, or fully automatic latches and may include one latch or two or more latches. The folded convertible top 22 is called the stack. Disposed on a rear 24 of the convertible top 22 is a window 36. Window 36 can be made from glass or a thermoplastic or the like and preferably folds away in the stack 22. Window 36 can be stitched to the fabric convertible top or adhered to the fabric convertible top 22 generally as shown by reference numeral 38. Preferably, the fabric roof member 22 is weatherproof to not allow any water to traverse into the interior of the vehicle. One example of a convertible top for an automobile is United States Published Patent Application No. 2009/0289468 A1 to Pecho et al., which is herein incorporated by reference in its entirety. However, it should be appreciated that the present disclosure may incorporate other convertible top designs and the above design forms no limitations to the present disclosure.

Many convertible automobiles, such as, for example, convertible automobiles made by FORD MOTOR COMPANY®, GENERAL MOTORS CORPORATION® and CHRYSLER MOTOR CORPORATION® include a fabric convertible top 22 that is installed as two separate units or a first fabric unit A and a second fabric window unit B that are connected to one another. The fabric convertible top 22 may alternatively be integrated into a single unit 22. The rear second fabric window unit B is often called the "curtain". The first fabric unit A has a front that is connected to a header bow (not shown).

The first fabric unit A may be stapled to a front edge of the header bow via tack strips which were embedded in a steel header bow. The second fabric window unit B is stapled into a rear trim stick (not shown). Alternatively, a retaining bar may be screwed against an inner edge of the second fabric window unit B. The first fabric unit A may be connected to the second fabric window unit B via a rear top bow (not shown). This is an attachment point where the first fabric unit A is stapled to the second fabric window unit B along location C, which may include a tacking strip that is embedded in the rear top bow (not shown) to accept the staples.

The fabric convertible top 22 may further include at least two rear pillar retainers (not shown) at location D and on an opposite side of location D the fabric convertible top 22. The top frame (not shown) underneath the fabric convertible top 22 has, usually, three hinged sections. Two sections are over the side windows at location D and one section is associated with the back window 36. The fabric convertible top 22 may further comprise a hold down cable (not shown). Cables are threaded through the side hems of the fabric convertible top 22. A front end of the cable is attached near the side of the header bow and its rear end is attached to the frame.

The fabric convertible top 22 may further include an intermediate bow. A screw, from underneath the fabric convertible top 22, at each end, pulls the con fabric convertible top 22 down to the intermediate bows. Finally, the fabric convertible top 22 at the second fabric rear window unit B may further include a rear pad. The rear pad refers to covered foam or the padded webbing that runs under the fabric convertible top 22. Generally, to embroider the convertible top 22 the first and second units A and B need to be removed from the above mentioned components and then reinstalled upon completion using, for example, a commercial stapler, and adhesive as is known in the art.

Disposed on a top side 40 of the fabric roof member 22 is an embroidered design 42. Embroidered design 42 is sufficiently large to be seen on a top side 40 of the fabric roof member 22 from a distance to provide an ornamental feature to the fabric roof member 22 that is appealing to the driver and that accentuates an ornamental appearance of the vehicle. Preferably, the embroidered design 42 comprises at least one yarn 44 being formed by stitching in an ornamental design. The embroidered design 42 is preferably shown as a rose pattern in FIG. 2; however, the rose design 42 forms no limitations to the present disclosure.

It should be appreciated that the embroidered design 42 may form an automobile design name, make and model, such as, for example, "MERCEDES® BENZ® SLK®" or the like. The embroidered design 42 may form a pictorial representation, an image, a picture of the owner, a scene, an advertisement, a logo, a message, text or any other character, text, logo, trademark, service mark, or image known in the art. In one embodiment, the embroidered design 42 may form a slogan or a vanity message regarding the owner, or for example to elect a candidate or the like. For example, the embroidered design 42 may form an irregular shaped aesthetic appearance such as a number of lines being placed in an interesting pattern to accentuate the appearance of the vehicle. In another embodiment, the embroidered design 42 may form a tie die, or a psychedelic pattern. Embroidered design 42 preferably can be made combining the vinyl roof member 22 with a needle and thread or yarn. Embroidered design 42 may also incorporate other materials such as metal strips, pearls, beads, quills, and sequins. Embroidered design 42 can be manufactured by hand or by using a computer aided design apparatus as will be discussed below. Embroidered design 42 may be stitched using chain stitch, buttonhole or blanket stitch, running stitch, satin stitch, cross stitch or any other stitching known in the art.

Embroidered design 42 may alternatively take the form of a jaguar design for JAGUAR® model automobile, a MUSTANG® design for FORD MUSTANG® model automobiles, a sports design for any car model (i.e. a sports logo), a lady bug image for a VOLKSWAGEN® model automobile, or the like and may be different for different gender drivers or car owners.

Figure 4:
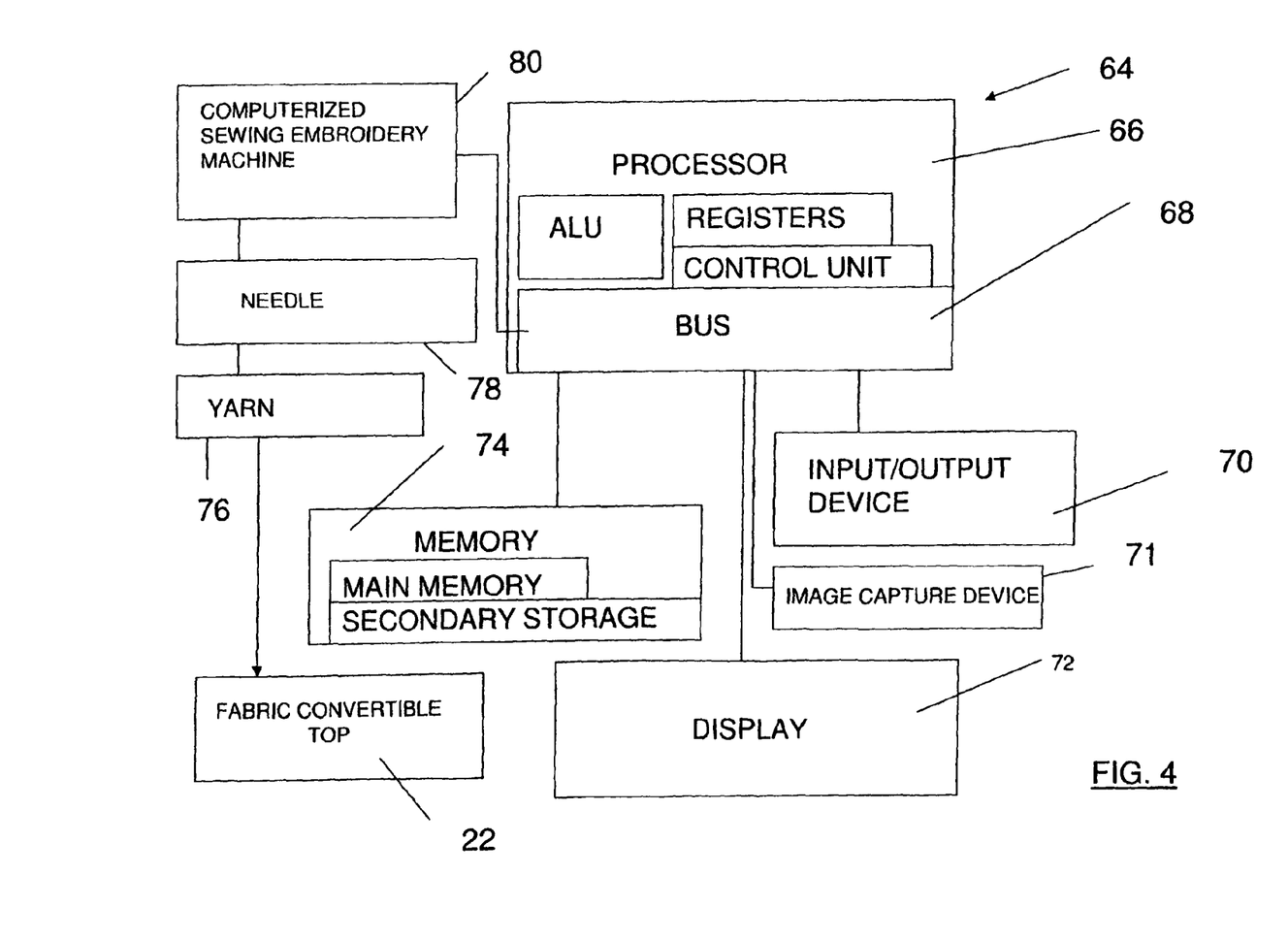
FIG. 4 shows a schematic view of an apparatus for manufacturing the decorative convertible top of FIG. 2.

Computer aided machine embroidery shown in FIG. 4 is similar to hand stitched embroidery, especially in the use of chain stitches, but the "satin stitch" and hemming stitches of machine work rely on the use of multiple threads. In manufacturing, the embroidered design 42 is preferably introduced through a canvas roof material 22; and at least one work thread is stitched through a fabric mesh to create a dense pattern that completely covers the canvas roof material 22. In another alternative embodiment, the canvas roof material 22 can be deformed or cut away to create holes that are then embellished with the embroidered design 42, often with thread in the same color as the canvas roof material 22.

The yarn 44 used in the embroidered design 42 may vary. The yarn 44 may comprises wool, linen, silk, cotton, rayon, a filament, a coated material, a metallic filament, or any other material known in the art. In yet another embodiment, the yarn 44 may comprise a ribbon in silk or a silk blend ribbon.

In yet a further embodiment of the present disclosure, the embroidered design 42 may further comprise a hoop or apparatus to stretch the roof member 22 to stretch the roof material 22 to ensure even stitching tension and that prevents pattern distortion. The embroidered design 42 may comprise symmetrical counted stitching patterns with designs developing from repetition of one or only a few similar stitches in a variety of thread hues.

Figure 3:
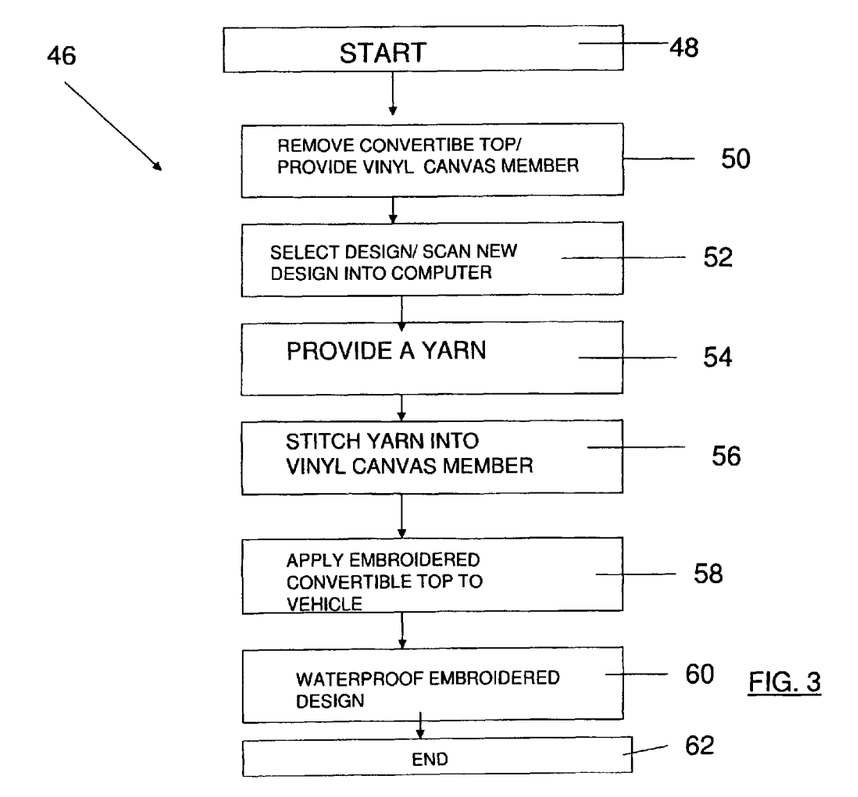
FIG. 3 shows a method of manufacturing the decorative convertible top of FIG. 2.
Figure 3A:
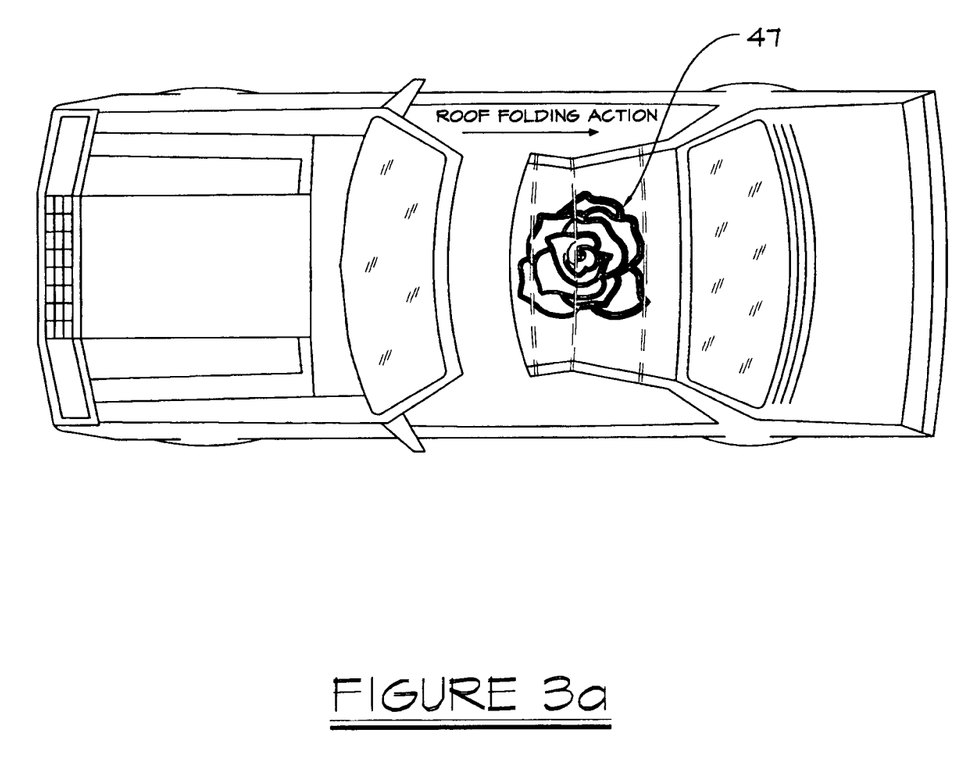
Figure 3B:
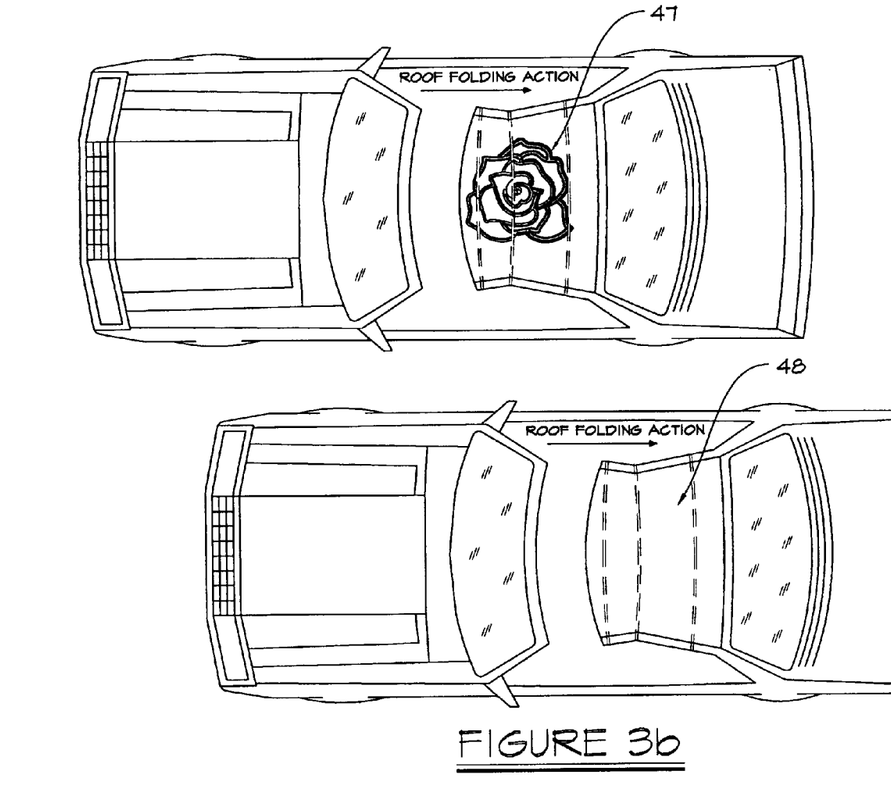

Turning now to FIG. 3, there is shown a method 46 according to the present disclosure for manufacturing an embroidered pattern 42 on a convertible fabric roof 22. At step 48, the method 46 commences and control of the method 46 passes to step 50. At step 50, the method 46, a convertible roof member 22 is provided. This may be performed by removing an existing convertible roof member 22 and frame or by providing a new convertible roof member 22 for installation to a vehicle. It should be appreciated that either configuration may be formed and the embroidered design 42 may be made in a new roof material 22 prior to installation to the vehicle, or alternative in a retrofit configuration whereby the roof material 22 already has been connected to the vehicle for a number of miles and then the roof material 22 is removed for introducing the embroidered design 42.

The present disclosure applies to existing convertible tops 22 or applies to a new convertible top 22 that may be installed during manufacture of the vehicle. In one embodiment, a user may drive a vehicle with an existing roof member 22 and may replace the roof member 22 with a roof member 22 having an embroidered design. In yet another embodiment, the user may remove the existing roof member 22 and have an embroidered design 42 stitched into the roof member 22 and then replace the roof member 22. Various configurations are possible and within the scope of the present disclosure. Thereafter, control passes to step 52.

In yet another alternative embodiment, individual patches may be embroidered separately with the embroidered design 42 with the use of an industrial embroidery machine and then fixed onto the car top 22 with removable glue. Removable glue is clear and allows for the transfer of the embroidered pattern 42 easily from one surface or another without any marks. The patches can therefore be permanent or temporary and replaceable. Embroidering car tops do not interrupt car assembly or make the process more complicated. Embroidering car tops distinguishes a car for the respective owner of the vehicle. Car owners may express themselves via the design 42 and choose a design 42 that they may selectively change over the course of the life of the car.

At step 52, the user may select an image that is preloaded and stored on a memory associated with the computer aided design embroidery and stitching machine or may scan an image and the digital representation of the image can be communicated to the computer aided design embroidery and stitching machine. Thereafter, control passes to step 54, where at least one yarn is provided. At step 56, the yarn is stitched into or on a top of the fabric roof member into a specific predetermined image or ornamental design to provide the embroidered design 42. At step 58, once the embroidered pattern 42 is completed, the roof member 22 having the embroidered design 42 is reapplied to the vehicle and reattached, or is alternatively, connected to the vehicle.

At step 60, if the yarn provided to manufacture the embroidered design pierces the fabric roof member 22, then a waterproofing operation is applied to the yarn and the fabric roof member 22. Water proofing material preferably prevents leaking. Preferably, the waterproofing may be a translucent coating that is applied to the yarn and the embroidered design that repels fluids. Waterproof fabrics are usually natural or synthetic fabrics that are laminated to or coated in some sort of relatively waterproofing material, such as rubber, polyvinyl chloride (PVC), polyurethane (PU), silicone elastomer, and wax; however other waterproofing materials may also be used. In yet another embodiment of the present disclosure a durable water repellant coating may be added to the yarn, the embroidered design 44 or the roof member 22 to make the materials water-resistant and hydrophobic. The treatments may be fluoropolymer based or with another material. One example can be a durable water repellant made under the trade name of RAINOFF S® by Eastern Color & Chemical Co., Inc. of New York. Thereafter, the method 64 at step 62 ends.

Turning now to FIG. 4, there is shown a schematic according to the present disclosure of a computerized system 64 to be used with the present disclosure. The present disclosure may be implemented on a computer system 64 operatively coupled to a computerized sewing and embroidery machine 80 that can receive program instructions from a processor 66 and that can output signals to the processor 66. The computer system 64 preferably includes the generic components of most general purpose computers. The computer system 64 includes a processor 66, which is a digital signal processor that includes a register, an arithmetic logic unit, which is a digital circuit that performs arithmetic and logical operations, and a control unit as is known in the art. Processor 66 is operatively connected to a bus 68. Bus 68 is a subsystem that transfers data between computer components inside a computer or between computers, for example from the processor 66 to the embroidered machine 80 and so on. Various components connect to the bus 68 of the system 64. The system 64 further includes an input/output device 70, which is a QWERTY keyboard, a mouse, a touch screen or the like to provide one or more commands to the bus 68 and to the processor 66. The system 64 also includes a memory 74 that includes a main memory, such as, a hard drive or a flash memory and a secondary storage, such as, a CD-Rom or the like. The system 64 also includes a display 72, which preferably allows a user to view a graphical output from the processor. Display 72 is connected to the bus 68.

Memory 74 preferably includes a software program that includes a number of program instructions for computer aided embroidery stitching at least one yarn 76 in an embroidered pattern on a convertible top. In one embodiment, the software program may be EMBROIDERY SUITE PRO® 2009 from MR. LOGO® of St. Louis, Mo., which is incorporated by reference in its entirety. In another embodiment, the software program may be PATTERN MAKER ME® by BUZZ TOOLS® of San Ramon, Calif., which is also incorporated by reference in its entirety or another software program.

The system 64 also includes a computerized sewing and embroidered machine 80 that includes at least one needle 78 and at least one yarn 76 disposed on a spindle or the like. Preferably, the user places the convertible fabric roof 22 on a plate or the like in proximity to the needle 78. The needle 78 then feeds the yarn 76 and stitches the yarn into the convertible fabric roof 22 into a predetermined pattern stored on the memory 74. Alternatively, a user may scan a desired image using an image capture device 71 that includes at least one device that optically scans images, printed text, handwriting, or an object, and converts it to a digital image to digitize the image. Device 71 then communicates the digital image to the bus 68 whereupon the processor 64 can control the sewing machine 80 to sew the yarns 76 into an embroidered pattern that approximates the desired digital image. The computerized sewing and embroidery machine 80 may be a SWF/E-UK1502DM, HIGH-SPEED DREAM MACHINE® manufactured from SWF EAST, INC.® of Tampa Fla.

Alternatively, the computerized sewing and embroidery machine 80 may be an industrial embroidery machine manufactured by TOYOTA® of Japan, or MEISTERGRAM® of Carlstadt, N.J., which include similar components and may differ from each other in the speed of stitching performance. Network modular machines, like the TOYOTA® embroidery machines, for instance, perform up to 12,000 stitches per minute. All industrial embroidery machines work with any type of fabric and are easy to operate, making the process of embroidering easy and low cost. In a further embodiment, a software program FORTE® can be installed in an embroidery machine 80 and allows for a specification of stitches for every image.

The computerized sewing and embroidered machine 80 may stitch about 1,500 or more stitches per minute into a sewing field of 500×450 mm. The computerized sewing and embroidered machine 80 also includes a tangle free thread tubing to receive yarn 76. Preferably, the sewing and embroidered machine 80 comprises an automatic oiling system and a USB Port for design transfer from the bus 68. The computerized sewing and embroidery machine 80 may further include a 10" high resolution LCD Monitor 72 with an automatic thread trimmer. The computerized sewing and embroidered machine 80 may further include a rotary thread break detection feature with a 2 million stitch memory capacity. The computerized sewing and embroidered machine 80 preferably is operatively connected to a 220 v single phase power source or a different commercial or residential power source. In a further embodiment of the present disclosure, the computerized sewing and embroidery machine 80 may form an entire convertible fabric roof 22 with an aperture for the window in addition to the embroidered design 42.

Figure 5:
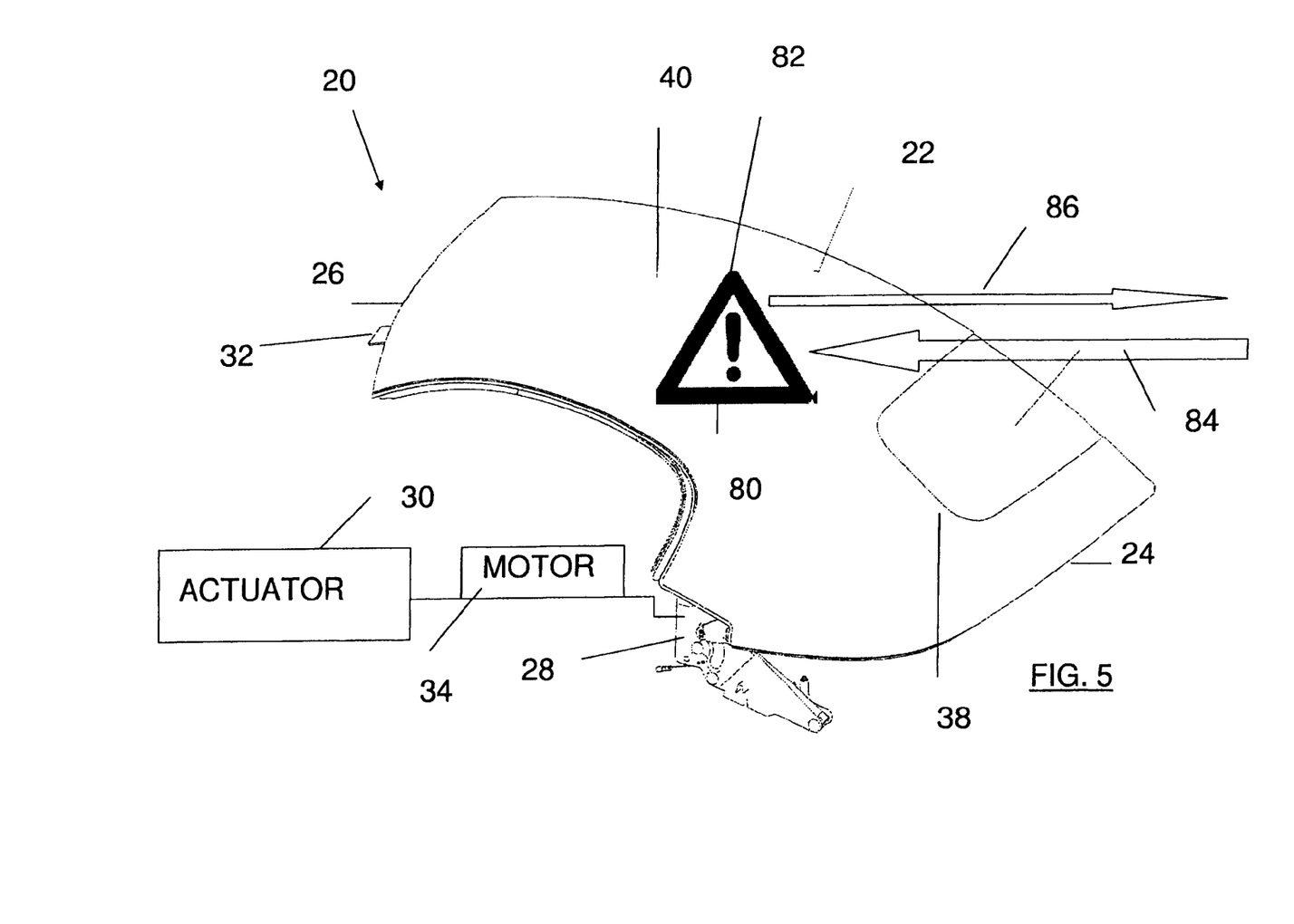
FIG. 5 shows a perspective view of the decorative convertible top having an embroidered design manufactured with at least one reflective yarn to provide an additional reflective surface according to the present disclosure

Turning now to FIG. 5, there is shown an alternative embodiment of the present disclosure of an embroidered design 80 that is manufactured from one or more reflective yarns 82. Preferably, the embroidered design 80 can be embroidered into the design of a warning symbol or a warning traffic symbol that reflects headlights of rear vehicles or street lamps to provide an additional reflective surface to the user. In operation, the reflective yarn 82 may include a coated yarn with a titanium dioxide or the like, which is stitched into the design 80. In another embodiment, the yarn 82 may be a metallic yarn or a fluorescent yarn. Metallic thread or yarn may be made of at least one precious metal such as silver or gold to provide a high quality decorative effect. In a further embodiment, the reflective surface may be formed from a metallic plastic film. Each of the filaments may include a reflective surface made from the introduction of a reflective material onto the filament. The yarn 82 may be coated with the reflective material and then embroidered in the roof material 22. For example, the embroidered design 80 can be a warning symbol or a traffic related symbol to facilitate warning other cars of the design 80. Headlights or streetlight beams 84 can be reflected into a rear beam 86 to alert individual drivers of the presence of the vehicle for an additional safety device. Preferably, the design 80 can glow in the dark or reflect light to facilitate warning drivers of the presence of the car.

Generally, in operation, the computer system operable with that method shown in FIG. 4 is controlled by an operating system. Typical examples of operating systems are MS-DOS, Windows95, 98, 2000, XP, Vista and Windows 7 from Microsoft Corporation, or Solaris and SunOS from Sun Microsystems, Inc., UNIX based operating systems, LINUX based operating systems, or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that is made therein without departing from the spirit and scope of the invention as defined by the following claims.

What is claimed is:

1. A vehicle safety device comprising:
a flexible convertible top disposed on a first vehicle; and
an embroidered pattern formed by at least one reflective yarn in the flexible convertible top, the reflective yarn reflecting a second vehicle's headlights and providing an indication of the first vehicle to a driver of the second vehicle.

2. The vehicle safety device of claim 1, wherein the flexible convertible top comprises canvas.

3. The vehicle safety device of claim 1, wherein the flexible convertible top is folded between a first and a second configuration on the first vehicle, and wherein the embroidered pattern does not impede manipulation between the first and the second configurations.

4. The vehicle safety device of claim 1, wherein the flexible convertible top and the embroidered pattern together do not allow leakage to traverse therethrough.

5. The vehicle safety device of claim 1, wherein the flexible convertible top and the embroidered pattern forms an advertisement on the first vehicle.

6. The vehicle safety device of claim 1, wherein the reflective yarn comprises a yarn being coated with a reflective material.

7. The vehicle safety device of claim 1, wherein the reflective yarn is arranged in an aesthetic pattern selected from the group consisting of an image, a picture, a pictorial representation, at least one character, text, a message, a logo, a slogan and any combinations thereof.

8. A method of decorating a convertible top for a vehicle comprising:
providing a flexible material on the vehicle; and
stitching at least one fiber in an embroidered pattern that visually contrasts from the flexible material to provide an aesthetic feature and comprising stitching the at least one fiber and the embroidered pattern with a reflective yarn to provide a safety feature to the vehicle.

9. The method of decorating a convertible top for a vehicle of claim 8, further comprising stitching at least one reflective fiber in the embroidered pattern to reflect a headlight or a street light to alert at least one second vehicle to a presence of decorating the convertible top.

10. The method of claim 8, further comprising a canvas as the flexible material.

11. A method of decorating a vehicle comprising:
providing a flexible material on the vehicle; and
stitching at least one fiber in an embroidered pattern that visually contrasts from the flexible material to provide an aesthetic feature to the vehicle; and further comprising moving the flexible material between a first and second configuration on the vehicle, and wherein the embroidered pattern does not impede moving the flexible material from being manipulated between the first and second configurations.

12. A method of decorating a vehicle comprising:
providing a flexible material on the vehicle; and
stitching at least one fiber in an embroidered pattern that visually contrasts from the flexible material to provide an aesthetic feature to the vehicle; and further comprising treating the embroidered pattern and flexible material and preventing fluids from leaking through the flexible material and embroidered pattern.

13. A method of decorating a vehicle comprising:
providing a flexible material on the vehicle; and
stitching at least one fiber in an embroidered pattern that visually contrasts from the flexible material to provide an aesthetic feature to the vehicle; and further comprising stitching the at least one fiber and the embroidered pattern to form an advertisement on the vehicle.

14. The method of claim 8, further comprising reflecting light on reflective yarn to reflect light to alert a driver of a second vehicle.

15. A method of decorating a vehicle comprising: embroidering an aesthetically pleasing decoration comprising at least one reflective yarn on a convertible top of a vehicle.

16. A method of decorating a convertible top comprising:
providing a convertible top connected to a vehicle, the convertible top comprising latches, a window, a frame, and a layer of fabric;
removing the convertible top from the vehicle;
removing the latches, the window, the frame from the layer of fabric;

introducing the layer of fabric to a sewing and embroidery machine;

selecting a pattern;

providing a yarn operatively coupled to the sewing and embroidery machine;

stitching the yarn into the layer of fabric, wherein the yarn forms an embroidered pattern that approximates the pattern;

cutting the yarn and removing the layer of fabric with the embroidered pattern from the sewing and embroidery machine;

connecting the latches, the window, and the frame to the layer of fabric with the embroidered pattern to form the convertible top with the embroidered pattern; and connecting the convertible top with the embroidered pattern to the vehicle.

17. The method of claim 16, further comprising providing a reflective yarn and stitching the reflective yarn into the layer of fabric.

18. The method of claim 16, further comprising providing a coating to the embroidered pattern to prevent fluid from traversing through the layer of fabric.

19. The method of claim 16, further comprising selecting the pattern from a plurality of patterns stored in a memory or selecting the pattern from a scanned image captured by an image capture device.

20. The method of claim 16, further comprising stitching the yarn into the layer of fabric, wherein the yarn forms the embroidered pattern that forms an advertisement in the layer of fabric.

21. The method of claim 16, wherein the yarn is integrated within the layer of fabric.

22. The method of claim 16, further comprising integrating decorative material into the pattern, wherein the decorative material is different additional decoration relative to the yarn.

23. A method of decorating convertible top for a vehicle comprising: embroidering an aesthetically pleasing at least one of a decoration on, in a form of a patch and advertisement comprising at least one yarn on the convertible top of the vehicle; and displaying the advertisement to least one viewer to promote the advertisement and the patch being removable connected to the convertible top.

\* \* \* \* \*